United States Patent [19]

Landrock et al.

[11] 4,392,097
[45] Jul. 5, 1983

[54] CIRCUIT ARRANGEMENT FOR THE CONTINUAL OPERATION MONITORING AND ERROR DIAGNOSIS OF A STEPPER MOTOR

[75] Inventors: Jürgen B. Landrock, Ehningen; Manfred Perske, Sindelfingen; Halim S. Tandjung, Gärtringen, all of Fed. Rep. of Germany

[73] Assignee: International Business Machines Corporation, Armonk, N.Y.

[21] Appl. No.: 203,752

[22] Filed: Nov. 3, 1980

[30] Foreign Application Priority Data

Nov. 10, 1979 [DE] Fed. Rep. of Germany ....... 2945458

[51] Int. Cl.³ .......................................... H02K 29/04
[52] U.S. Cl. .................................. 318/696; 318/685
[58] Field of Search ........................................ 318/696

[56] References Cited

U.S. PATENT DOCUMENTS 3,359,474 12/1967 Welch et al. ......................... 318/138
3,896,363 7/1975 Kinsel et al. ......................... 318/685

FOREIGN PATENT DOCUMENTS 1588266 9/1970 Fed. Rep. of Germany .
2018467 10/1979 United Kingdom .

*Primary Examiner*—J. V. Truhe
*Assistant Examiner*—Saul M. Bergmann

[57] ABSTRACT

A circuit arrangement is provided for the continual operation monitoring and error diagnosis of a stepper motor controllable at its windings by control logic and driver stages using stepping pulses which are phase-shifted relative to each other. A multi-stage ring counter is used for logically representing the desired values of the stepping pulses with the ring counter under control of the stepping control pulses applied to the input of the control logic stage. A multi-stage compare circuit arrangement is used to compare the logical values of the stepping pulses from the ring counter with the logical values of the output signals from both the control logic stage and driver stage.

11 Claims, 6 Drawing Figures

| | STEP 1 | STEP 2 | STEP 3 | STEP 4 | STEP 5 | STEP 6 |
|---|---|---|---|---|---|---|
| RING COUNTER CONTENT(= $U_A$) $\boxed{U_A}$ | 1 | 1 | 0 | 0 | 1 | 1 |
| $U_{KALOG}$ DESIRED | 0 | 0 | 1 | 1 | 0 | 0 |
| $U_{KALOG}$ T1 SHORT-CIRCUITED FAILURE OCCURS AT t3 OR t2 | 0 $\downarrow$ t3 | 0 $\downarrow$ t2 | 0 EARLIEST DETECTING TIME | 0 | 0 | 0 |
| $U_{KALOG}$ T1 SHORT-CIRCUITED FAILURE OCCURS AT t1 | 0 | 0 | 1 $\downarrow$ t1 0 IMMEDIATELY DETECTABLE | 0 | 0 | 0 |
| $U_{KALOG}$ T1 SHORT-CIRCUITED FAILURE OCCURS AT t0 | 0 | 0 | 1 | 1 $\downarrow$ t0 0 IMMEDIATELY DETECTABLE | 0 | 0 |
| $U_{KALOG}$ T1 OPEN CIRCUIT FAILURE OCCURS AT t3 OR t2 | 0 | 0 | 1 $\downarrow$ t3 | 1 $\downarrow$ t2 | 1 EARLIEST DETECTING TIME | 1 |
| $U_{KALOG}$ T1 OPEN CIRCUIT FAILURE OCCURS AT t1 | 0 | 0 | 1 | 1 | 0 $\nearrow$ 1 $\downarrow$ t1 IMMEDIATELY DETECTABLE | 1 |
| $U_{KALOG}$ T1 OPEN CIRCUIT FAILURE OCCURS AT t0 | 0 | 0 | 1 | 1 | 0 | 0 $\nearrow$ 1 $\downarrow$ t0 IMMEDIATELY DETECTABLE |
| $U_{KALOG}$ S1 OPEN CIRCUIT OR D1 DEFECTIVE FAILURE OCCURS AT t3 OR t2 | 0 $\downarrow$ t3 | 0 $\downarrow$ t2 | FLOATING EARLIEST DETECTING TIME | FLOATING | | |
| $U_{KALOG}$ S1 OPEN CIRCUIT OR D1 DEFECTIVE FAILURE OCCURS AT t1 | 0 | 0 | 1 $\downarrow$ t1 IMMEDIATELY DETECTABLE | FLOATING | | |
| $U_{KALOG}$ S1 OPEN CIRCUIT OR D1 DEFECTIVE FAILURE OCCURS AT t0 | 0 | 0 | 1 | 1 $\downarrow$ t0 IMMEDIATELY DETECTABLE | FLOATING 0 | 0 |

FIG. 7

CIRCUIT ARRANGEMENT FOR THE CONTINUAL OPERATION MONITORING AND ERROR DIAGNOSIS OF A STEPPER MOTOR

DESCRIPTION

BACKGROUND OF THE INVENTION

1. Field of the Invention

The present invention relates to a circuit arrangement for the continual operation monitoring and error diagnosis of a stepper motor controlled at its windings by control logic and driver stages. More particularly, the present invention relates to a circuit arrangement for the continual operation, monitoring and error diagnosis of a stepper motor controlled at its windings by control logic and driver stages using stepping pulses which are phase-shifted relative to each other.

2. Description of the Problem and Prior Art

Typically, stepper motors have to be operated at particular pulse sequences. Such sequences are normally generated by means of control logic circuitry, an example of which is shown in German Auslegeschrift No. 19 58 032. The phase-shifted stepping pulses thus generated are subsequently applied to the individual phase windings of the stepper motor via driver stages which, in most cases, are designed using transistor switches. The operation of such stepper motors must be free from errors, and errors occurring, if any, must be detectable both with regard to their nature and location.

SUMMARY OF THE INVENTION

In accordance with the present invention a circuit arrangement is provided which, by means of continual operation monitoring, permits determining at any time whether an error has occurred in the control logic or one of the driver stages and which, in accordance with a further embodiment, permits determining whether failures of driver stages are attributable to open- or short-circuits. In accordance with further aspects of the present invention, the continual operation monitoring is achieved by using a multi-stage ring counter for logically representing the desired values of the stepping pulses with the basic setting of said multi-stage ring counter being derivable from the output signals of the control logic which are fed to the individual ring counter stages and from a further signal which is jointly applied to said stages. Clock-controlled incrementation of said counter is effected as a function of the stepping control pulses applied to the input of the control logic. A multi-stage compare circuit is controlled by the logic output signals of said ring counter on the one hand and by the logic output signals derivable from the driver stages on the other. The compare circuit is clock-controlled by clock pulses derived from the stepping control pulses.

The arrangement is preferably such that for the continual monitoring of the logic portion, the outputs of the logic portion supplying the control voltages for the driver stages are connected to one stage each of the compare circuit. In addition, the outputs of the corresponding stages of the ring counter are in each case connected to the same stages of the compare circuits with said ring counter directly incrementable by stepping control pulses, and with the compare circuit clock-controlled by the same stepping control pulses via a delay element.

It is particularly favorable that for continually monitoring the driver stages of the driver portion, signals indicating the switching state of the driver stages are derived from the collectors of the latter after level conversion into corresponding logical values, said signals being applied to the corresponding stages of the compare circuit. In accordance with such an arrangement, the individual stages of the ring counter are incrementable by stepping control pulses, and the compare circuit is clock-controlled by the same stepping control pulses via a delay element. It is particularly advantageous that for error diagnosis an evaluator circuit with display means is provided, wherein by logically comparing the values of each stage, which are contained in the ring counter, and after level conversion of the logical values derived from the collector of the individual driver stages, one of several possible error conditions can be directly detected and displayed for each driver stage.

It is, therefore, an object of the present invention to provide a circuit arrangement for error detection in stepper motor systems.

It is a further object of the present invention to provide a circuit arrangement for the continual operation monitoring and error diagnosis of a stepper motor.

It is yet a further object of the present invention to provide a circuit arrangement for error diagnosis of stepper motors controlled at their windings by control logic and driver stages using stepping pulses which are phase-shifted relative to each other.

DETAILED DESCRIPTION OF THE DRAWINGS

Figure 1:
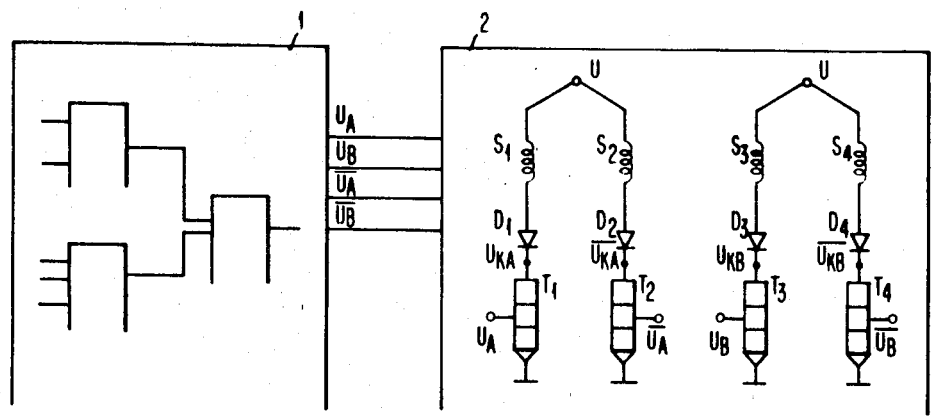
FIG. 1 shows a schematic diagram of a control circuit for a stepper motor.

FIG. 1 shows, in simplified form, conventional control circuitry for a stepper motor. In this regard, it should be understood that, for purposes of clarity and simplicity, only that circuitry and hardware essential to an understanding of the present invention has been shown.

Standard control logic 1 in FIG. 1 (shown by ways of a block diagram which will be explained in greater detail in connection with FIG. 3) supplies at its output four voltages, $U_A$, $U_B$, $\overline{U}_A$, and $\overline{U}_B$ which are phase-shifted relative to each other. These voltages are applied to standard driver portion 2 having four driver stages for driving phase windings S1, S2, S3 and S4. Needless to say, the number of phase-shifted stepping pulses emitted must correspond to the number of the phase windings of the stepper motor. Driver portion 2 comprises four driver transistors T1, T2, T3 and T4 which, by means of the respective phase windings S1, S2, S3 and S4, are series-connected via respective diodes D1, D2, D3 and D4 between a voltage source U and ground. Control of the driver transistors T1 to T4 is effected via their respective base electrodes 21, 22, 23 and 24. During this control, the potentials $U_{KA}$, $\overline{U}_{KA}$, $U_{KB}$ and $\overline{U}_{KB}$, as shown in FIG. 2, occur at the respective collectors of the driver transistors T1 to T4.

Figure 2:
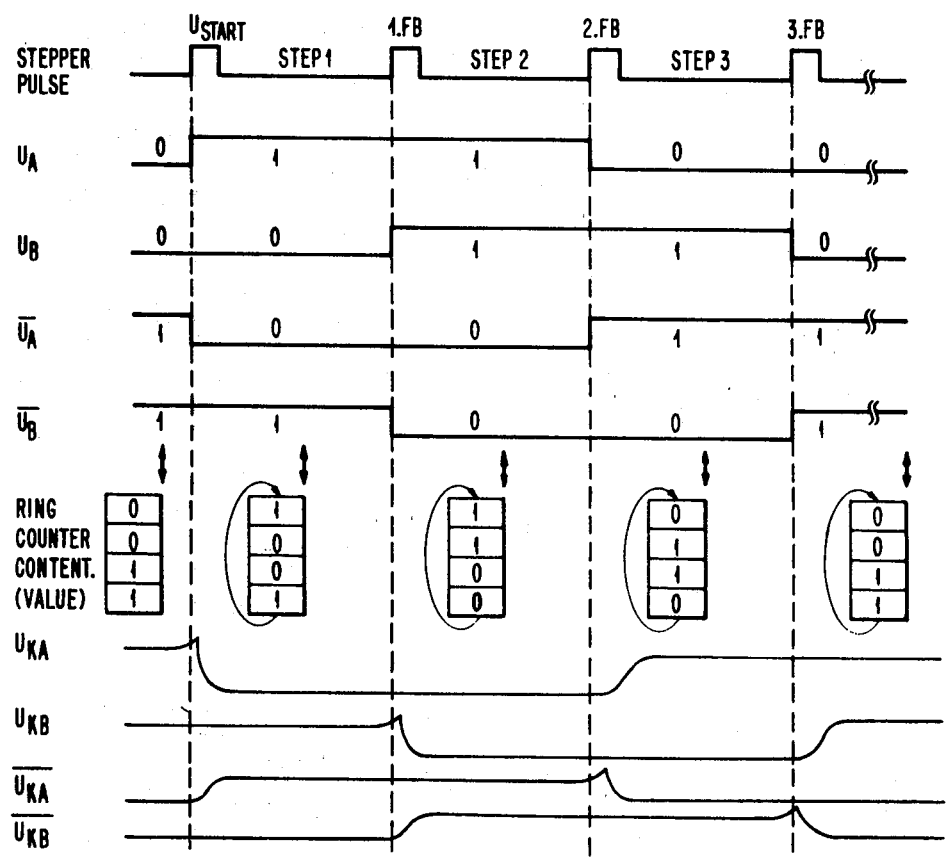
FIG. 2 shows schematic pulse diagrams for control of the stepper motor, the logic signals derived therefrom and the respective position of the ring counter.

FIG. 2 shows the timing diagram of individual pulses and voltages. As will be explained in greater detail in connection with FIG. 3, the start up position of the circuit arrangement ring counter (prior to the application of the starting pulse) is shown in FIG. 2 to the left of $U_{Start}$ wherein, from top to bottom, the respective values are shown as 0, 0, 1, 1. Upon the occurrence of the starting pulse $U_{Start}$, the ring counter is incremented by one wherein the potentials $U_A$ ($\overline{U}_{KA}$), $U_B$ ($\overline{U}_{KB}$), $\overline{U}_A$ ($U_{KA}$) and $\overline{U}_B$ ($U_{KB}$) in the first period logically become 1, 0, 0, 1. This shows that the potentials occurring during the first time interval correspond exactly to the position in the ring counter incremented by one pulse. The same holds for the subsequent pulse or clock intervals.

Figure 3:
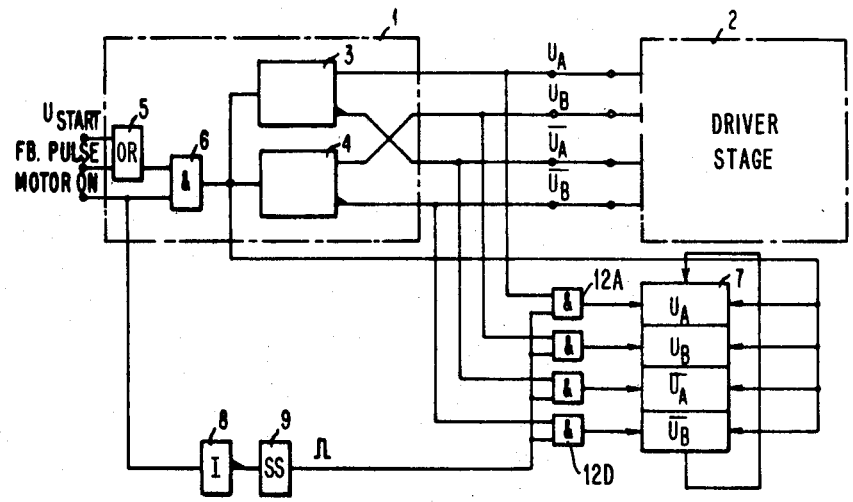
FIG. 3 shows the part of the circuit arrangement in accordance with the present invention concerning the start up of a stepper motor.

As may be seen in more detail in FIG. 3, control logic 1, shown in block form in FIG. 1, comprises two bistable multivibrators 3 and 4 controlled via an OR gate 5 and AND gate 6. The starting pulse $U_{Start}$ is applied to the two bistable multivibrators 3 and 4 via OR gate 5 and AND gate 6. In the standby state there are no feedback pulses applied to the second input of OR gate 5, and the pulse for switching on the motor is not present at the "motor on" terminal. Such condition corresponds to a logical zero. The logic output signals $U_A$, $U_B$, $\overline{U}_A$ and $\overline{U}_B$ occurring at the outputs of bistable multivibrators 3 and 4 are fed, via AND gates 12A–12D, to four-stage ring counter 7. The second input to these AND gates is connected, via inverter stage 8 and monostable multivibrator 9, to the "motor on" input terminal for switching on the motor. With the "motor on" signal not available a binary zero condition exists. When a "motor on" pulse signal is applied, monostable multivibrator 9 is actuated emitting a pulse, (produced only once) for application to the second inputs of AND gates 12A–12D thereby setting ring counter 7 to its starting position according to the output values of the bistable multivibrators 3 and 4, which represent the logic values for $U_A$, $U_B$, $\overline{U}_A$, $\overline{U}_B$.

It should be readily apparent that upon the occurrence of the "motor on" pulse, which corresponds to a logical one, AND gates 12A–12D become blocked due to the effect of inverter stage 8. The output signals of control logic 1 are applied to driver stage 2 for control purposes. It should also be readily apparent that with the occurrence of the "motor on" pulse signal both the starting pulse $U_{Start}$ and feedback pulses FB are applied, via OR gate 5, to AND gate 6 which was blocked prior to the occurrence of the "motor on" pulse. At the time the $U_{Start}$ pulse of FIG. 2 occurs in response to the motor starting pulse, the first stepping pulse is generated. This latter pulse is fed to bistable multivibrators 3 and 4 and to ring counter 7 for incrementation. From that point onwards, the ring counter is incremented by means of the feedback pulses which are applied to OR gate 5 and which are derived, in a manner not shown, from the circuit proper.

Figure 4:
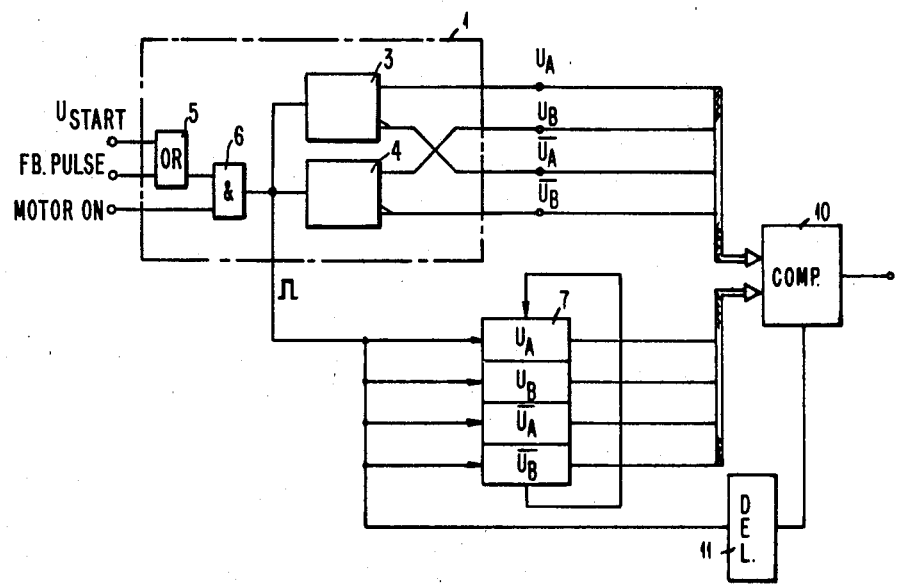
FIG. 4 shows a schematic circuit diagram embodying the principle used to monitor the logic portion.

FIG. 4 shows a circuit arrangement used to monitor control logic 1. The logic output signals occurring at the output of control logic 1, and which are designated as $U_A$, $U_B$, $\overline{U}_A$ and $\overline{U}_B$, are fed to a four-stage compare circuit 10. In the same manner, the desired values $U_A$, $U_B$, and $\overline{U}_A$ and $\overline{U}_B$ stored in ring counter 7 for each clock interval, are applied to the corresponding stages of compare circuit 10. Simultaneously, the stepping pulses, as shown in FIG. 3, are fed as clock to ring counter 7 for incrementation and, via a delay element 11 for clock control, to compare circuit 10. The delay introduced by delay element 11 is necessary, as the ring counter 7 is also subject to a certain delay during incrementation.

In accordance with features of the present invention, an error in control logic 1 can be detected by comparing in compare circuit 10 the individual logic signals, i.e., the output signals of control logic 1 with the output signals of ring counter 7 which represent the desired values. Such an error is indicated for each stage of compare circuit 10 by a mismatch of the logical values thus compared.

Figure 5:
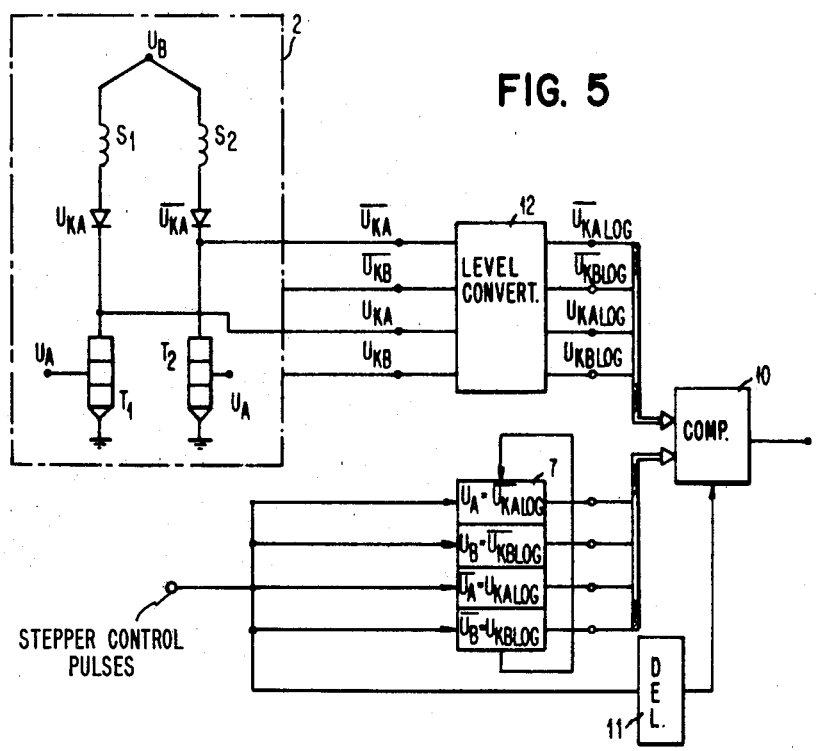
FIG. 5 shows a schematic circuit diagram embodying the principle used to monitor the driver stages.

FIG. 5 shows an arrangement used to monitor the individual driver stages of driver portion 2. The figure shows only a part of driver 2 with driver transistors T1 and T2, phase windings S1 and S2 and diodes D1 and D2 series-connected between operating voltage source U and ground potential. The voltages $U_{KA}$ and $\overline{U}_{KA}$, respectively, are derived from the collector electrodes of the two driver transistors T1 and T2 and are fed to a level converter 12 (in order to convert the non-standard pulse output of driver stage 2 into a standard digital signal) forming the corresponding logic signals $\overline{U}_{KA\ LOG}$ and $U_{KA\ LOG}$. Similarly, the collector voltages $\overline{U}_{KB}$ and $U_{KB}$ occurring at driver transistors T3 and T4 (not shown) are applied, via connecting lines, to level converter 12 where they are converted into corresponding logical values $\overline{U}_{KB\ LOG}$ and $U_{KB\ LOG}$. As for monitoring the control logic, ring counter 7 contains the corresponding desired values. In this case, ring counter 7 is incremented by means of stepping control pulses which are also used to clock-control compare circuit 10 via delay element 11. A mismatch in one of the stages of compare circuit 10 between the desired values stored in ring counter 7 and the desired values supplied by level converter 12 indicates that one of the driver stages in the driver portion is defective, although the type of defect cannot readily be determined. On the other hand, clock control of compare circuit 10 also permits checking and monitoring the synchronization of the stepping control pulses, the stepping pulses, and the step-by-step incrementation of the stepper motor.

Figure 6:
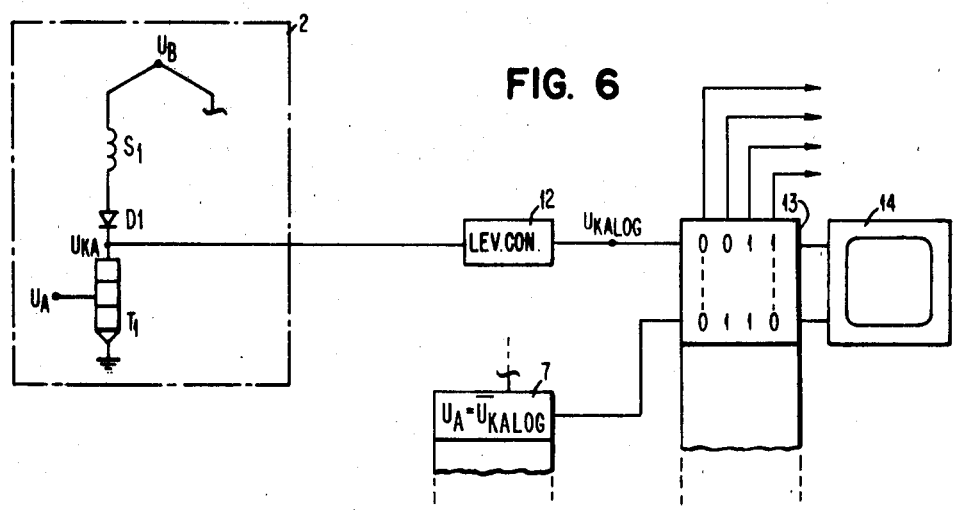
FIG. 6 shows a schematic circuit diagram embodying the principle used to diagnose errors by means of a bit pattern comparison.

By means of the circuit arrangement in accordance with FIG. 6, it can readily be diagnosed which of the driver stages has failed. For the sake of simplicity, FIG. 6 shows only driver transistor T1, diode D1 and phase winding S1 series-connected between operating voltage U and ground potential. In this case, collector voltage $U_{KA}$ is also converted into a logic value $U_{KA\ LOG}$ in level converter 12. The desired value $U_A$ stored in ring counter 7 is taken from latter, and the two logical values are fed to a bit pattern compare circuit 13 to which a display unit 14 or other display means may be selectively connected. For the sake of simplicity, the bit patterns used for the bit pattern comparison are shown. When the bit combination 0, 1 or 1, 0 occurs for driver stage 1 with driver transistor T1 and phase winding S1, the driver stage is free from errors. Occurrence of the bit combinations 0, 0, indicates that in the illustrated case transistor T1 is defective and short-circuited. Occurrence of the bit combination 1, 1 on the other hand indicates that transistor T1 is open-circuited.

The principle of error diagnosis using bit patterns derived from the ring counter and the actual logic signals or switching states can be arbitrarily extended. A detailed analysis is obtained by storing the bit patterns and evaluating them over a number of steps. It can also be determined whether instead of an error in one of the driver transistors T1–T4 there is an open-circuit in one of the motor windings S1–S4 or one of the diodes D1–D4. Normally, the operating voltage U is applied to the collector of driver transistor T1 via the motor winding S1 and the diode D1. If the latter transistor is nonconducting, the collector voltage $U_{KA}$ is high and if it is conducting, $U_{KA}$ is low. In the case of an open-circuited winding or a defective diode, $U_{KA}$ is floating if T1 is nonconducting and it is low if T1 is conducting. After level conversion of the collector voltages into logical values, this evaluation can be effected in the same manner as described above, using logic circuits or a microcode.

By means of the novel, simple circuit, the various parts of which (including the driver transistors and the diodes of the control logic, the ring counter, and the logic circuit elements) can be realized in integrated technology, a reliably operating circuit arrangement is obtained for the continual operation monitoring and error diagnosis of a stepper motor controlled at its windings by means of a control logic and driver stages, using stepping pulses which are phase-shifted relative to each other. The advantage to this is that operation monitoring and diagnosis can be effected by means of simple logic components. In addition, error indication is effected upon the occurrence of the next stepping or feedback pulse at the very latest, so that other components are not affected by such errors. This kind of self-diagnosis permits the error location to be readily determined and offers considerable savings during maintenance and diagnosis. At the same time, synchronization monitoring is effected, which is particularly advantageous for stepper motors.

While the invention has been particularly shown and described with reference to the preferred embodiment thereof, it will be understood by those skilled in the art that various changes in form and detail may be made therein without departing from the spirit and scope of the invention.

We claim:

1. A process for the continual operation monitoring and error diagnosis of a stepper motor controllable at its windings by a control logic stage and driver stage using stepping pulses which are phase-shifted relative to each other, comprising the steps of;

forming signals representative of the respective logical values of said phase-shifted stepping pulses;

forming signals through level conversion having logical values representative of the respective switching states of said driver stage; and comparing said signals representative of the respective logical values of said phase-shifted stepping pulses with said signals having logical values representative of the respective switching states of said driver stage whereby absence of comparison is indicative of error.

2. The process as set forth in claim 1 wherein said step of comparing is clock-controlled by a signal derived from stepping control pulses applied to the input of said control logic stage.

3. The process as set forth in claim 1 wherein said phase-shifted stepping pulses comprise four phase-shifted stepping pulses.

4. The process as set forth in claim 1 wherein said step of comparing said signals representative of the respective logical values of said phase-shifted stepping pulses with said signals having logical values representative of the respective switching states of said driver stage comprises comparing bit patterns of said respective signals.

5. The process as set forth in claim 4 wherein said step of forming signals representative of the respective logical value of said phase-shifted stepping pulses comprises forming said signals with a multi-stage ring counter which is set in accordance with the logic state of said control logic stage.

6. A circuit arrangement for the continual operation monitoring and error diagnosis of a stepper motor controllable at its windings by a control logic stage and driver stage with said control logic stage responsive to stepper control pulses to produce respective control logic stage output stepping pulses to said driver stage which are phase-shifted relative to each other, comprising:

multi-stage ring counter means having input means to the respective stages thereof and output means from the respective stages thereof and arranged to provide signals corresponding to the respective logical values of said phase-shifted stepping pulses;

means to couple the said input means to the respective stages of said multi-stage ring counter means to the said respective control logic stage output stepping pulses to set said multi-stage ring counter means in accordance with the logic state of said control logic stage;

further means to couple said multi-stage ring counter means to the said stepper control pulses applied to said control logic stage to provide clock-controlled incrementation of said multi-stage ring counter means in response thereto;

multi-stage compare circuit means having first and second sets of input means;

means to couple the said first set of input means to said multi-stage compare circuit means to the said output means from the respective stages of said multi-stage ring counter means so that said multi-stage compare circuit means receives said signals corresponding to the respective logical values of said phase-shifted stepping pulses from said multi-stage ring counter means; and level converter means arranged to couple the said second set of input means to said multi-stage compare circuit means to the said windings of said driver stage to form signals having logical values representative of the switching state of said driver stage whereby the absence of comparison in said multi-stage compare circuit means is indicative of error.

7. The circuit arrangement set forth in claim 6 wherein said multi-stage compare circuit means is clock-controlled by clock pulses derived from said stepper control pulses applied to said control logic stage.

8. The circuit arrangement as set forth in claim 6 wherein said multi-stage ring counter means is a four-stage ring counter means and said stepping pulses are four phase-shifted stepping pulses.

9. The circuit arrangement as set forth in claim 7 wherein said multi-stage compare circuit means is a multi-stage bit pattern compare circuit means.

10. The circuit arrangement as set forth in claim 9 wherein said multi-stage bit pattern compare circuit means, multi-stage ring counter means and level converter means are all four-stage means.

11. The circuit arrangement as set forth in claim 9 wherein said driver stage includes four driver means for providing said phase-shifted stepping pulses to four phase windings of said stepper motor and wherein said multi-stage ring counter means, level converter means and multi-stage bit pattern compare circuit means each comprise corresponding four stages.

* * * * *